US008989734B2

(12) United States Patent
Ekici et al.

(10) Patent No.: US 8,989,734 B2
(45) Date of Patent: Mar. 24, 2015

(54) METHOD AND APPARATUS FOR WIRELESS NETWORK SELECTION

(75) Inventors: Ozgur Ekici, Ottawa (CA); Muhammad Khaledul Islam, Ottawa (CA); Dimitrios Prodanos, Ottawa (CA); Jeffrey William Wirtanen, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 741 days.

(21) Appl. No.: 13/249,356

(22) Filed: Sep. 30, 2011

(65) Prior Publication Data

US 2013/0084855 A1    Apr. 4, 2013

(51) Int. Cl.
*H04W 4/00* (2009.01)
*H04W 48/18* (2009.01)
*H04W 52/02* (2009.01)

(52) U.S. Cl.
CPC .......... *H04W 48/18* (2013.01); *H04W 52/0216* (2013.01); *H04W 52/0245* (2013.01)
USPC ....................................... 455/432.1; 455/574

(58) Field of Classification Search
USPC ............. 455/422.1, 435.3, 574, 432.1, 435.2, 455/436–444; 370/311, 310, 328, 331–333, 370/338
See application file for complete search history.

(56) References Cited

U.S. PATENT DOCUMENTS

| 8,145,210 B2* | 3/2012 | Thalanany et al. | 455/432.1 |
| 2006/0268711 A1* | 11/2006 | Doradla et al. | 370/235 |
| 2007/0275717 A1* | 11/2007 | Edge et al. | 455/434 |
| 2009/0068969 A1 | 3/2009 | Lindoff et al. | |
| 2009/0088108 A1 | 4/2009 | Granlund et al. | |
| 2010/0022242 A1 | 1/2010 | Nizri et al. | |
| 2010/0075665 A1 | 3/2010 | Nader et al. | |
| 2011/0275369 A1* | 11/2011 | Bartlett et al. | 455/433 |
| 2012/0264483 A1* | 10/2012 | Chin et al. | 455/552.1 |

FOREIGN PATENT DOCUMENTS

| EP | 1517575 A2 | 3/2005 |
| WO | 2007086679 A1 | 8/2007 |
| WO | 2008082769 A1 | 7/2008 |
| WO | 2008155444 A1 | 12/2008 |
| WO | 2011058214 A1 | 5/2011 |

OTHER PUBLICATIONS

3GPP 23.122, V6.0.0, "3rd Generation Partnership Project; Technical Specification Group Core Network; NAS Functions Related to Mobile Station (MS) in Idle Mode" (Release 6), (Mar. 2004).
3GPP TS 25.304, V6.0.0, "3rd Generation Partnership Project; Technical Specification Group Radio Access Network; User Equipment (UE) Procedures in Idle Mode and Procedures for Cell Reselection in Connected Mode" (Release 6), (Dec. 2003).
3GPP TS 36.304, V8.0.0, "3rd Generation Partnership Project; Technical Specification Group Radio Access Network; Evolved Universal Terrestrial Radio Access (E-UTRA); User Equipment (UE) Procedures in Idle Mode" (Release 8), (Dec. 2007).

(Continued)

*Primary Examiner* — Ajit Patel

(57) ABSTRACT

The application relates to wireless network selection. The effect of wireless network selection upon operation time of the mobile device is considered in making the wireless network selection.

18 Claims, 5 Drawing Sheets

(56) References Cited

OTHER PUBLICATIONS

3GPP TS 43.022, V6.0.0, "3rd Generation Partnership Project; Technical Specification Group GSM/EDGE Radio Access Network; Functions Related to Mobile Station (MS) in Idle Mode and Group Receive Mode" (Release 6), (Nov. 2002).

3GPP 25.133, V6.0.0, "3rd Partnership Project; Technical Specification Group Radio Access Network; Requirements for Support of Radio Resource Management (FDD)" (Release 6), (Dec. 2002).

3GPP2 C.S0011-D, Version 1.0, "Recommended Minimum Performance Standards for cdma2000 Spread Spectrum Mobile Stations", Mar. 2011.

3GPP2 C.S.0033-A, v2.0, "Recommended Minimum Performance Standards for CDMA2000 High Rate Packet Data Access Terminal", Aug. 2007.

Yang, Shun-Ren, "Dynamic Power Saving Mechanism for 3G UMTS System", Mobile Networks and Applications (MONET), vol. 12, No. 1, Feb. 2007.

Trestian, Ramona et al., "Power-Friendly Access Network Selection Strategy for Heterogeneous Wireless Multimedia Networks", IEEE International Symposium on Broadband Multimedia Systems and Broadcasting (BMSB), Mar. 2010.

\* cited by examiner

METHOD AND APPARATUS FOR WIRELESS NETWORK SELECTION

FIELD

The application relates to wireless network selection by a mobile device, for example for limited service and specific roaming scenarios.

BACKGROUND

When a mobile device is in a geographical location in the home country with no wireless coverage from a home network operator, the mobile device may have no choice but select another network that only provides limited service such as allowing only emergency calls. A cellular wireless network is typically identified by a PLMN (public land mobile network) identifier. Depending on the network coverage, a mobile device can spend a considerable amount of time in limited service state on any other network operator's cell.

For instance, if a mobile device, registered with PLMN-1 in its home country that provides full subscribed services, loses network coverage, it will camp on any other available network in the same country. Due to the lack of roaming agreements between network operators, a mobile device may not be able to obtain its subscribed services on any of these available networks, and will select an "acceptable cell" that belongs to another network operator where it can only make emergency calls. Given the availability of multiple acceptable cells from multiple PLMNs to camp on in limited service state, a mobile device typically selects the first cell that it failed to register on, regardless of PLMN configuration.

The home network of a roaming user (e.g. Country: A, PLMN-1) may have similar roaming agreements with multiple network operators in another country (e.g. Country: B, PLMN-2 and PLMN-3). The mobile device may have multiple options for selecting a network to roam on in such a situation. This may, for example, be the case when no information about roaming networks is specified on the subscription module of the device, for example in a "PLMN Selector" List, "User Controlled PLMN Selector with Access Technology" list or an "Operator Controlled PLMN Selector with Access Technology" list in a Universal Subscriber Identity Module (USIM) or similar module that resides on the device. Examples of such modules include (but are not limited to) Subscriber Identity Module (SIM), IP Multimedia Services Identity Module (ISIM), and Removable User Identity Module (RUIM), CDMA SIM (CSIM). It may also be the case that no network specified in the USIM or similar module is available at the location. In such circumstances, the mobile device may select and attempt registration on another available PLMN. There may be limitations placed on the selection of another PLMN. For example, the technical specification (TS) of $3^{rd}$ Generation Partnership Project (3GPP) states that any PLMN that offers a "high quality" signal can be selected, where "high quality" is as defined in TS 3GPP 23.122 and TS 25.304.

BRIEF DESCRIPTION OF THE DRAWINGS

Embodiments of the disclosure will now be described with reference to the attached drawings in which.

DETAILED DESCRIPTION

Figure 1:
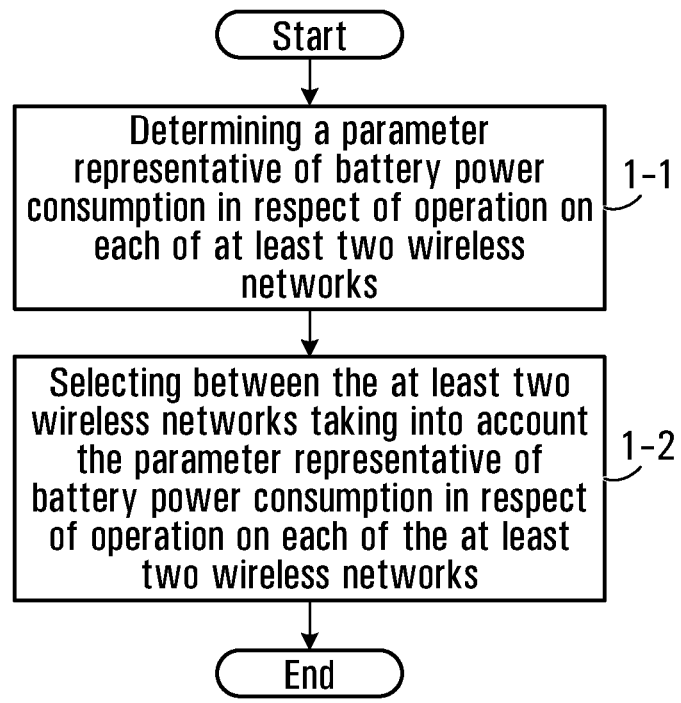
FIG. 1 is a flowchart of a method of wireless network selection.

According to a broad aspect, the disclosure provides a method in a mobile device, the method comprising: selecting a wireless network between at least two wireless networks taking into account at least one parameter representative of battery power consumption in respect of operating on each of the at least two wireless networks.

Another broad aspect provides a mobile device comprising: at least one antenna; at least one wireless access radio; a wireless network selector that selects between at least two wireless networks taking into account a parameter representative of battery power consumption in respect of operating on each of the at least two wireless networks.

Another broad aspect provides a computer readable storage medium having stored thereon instructions that when executed by a mobile device cause the mobile device to perform a method comprising: selecting between at least two wireless networks taking into account a parameter representative of battery power consumption in respect of each of the at least two wireless networks.

In the embodiments described above, and the embodiments described below, network selection is performed taking into account a parameter representative of battery power consumption. In other embodiments, network selection may be performed using any of the embodiments described herein, but taking into account a more general parameter representative of power consumption in place of the parameter representative of battery power consumption. Power consumption in this context may, for example, include one or more of battery power consumption when the device is operating off of a battery, power consumed from a power supply, a charger, a Universal Serial Bus (USB) connection providing a power source, or any other suitable power source which is used to provide power to the mobile device.

For a mobile device in limited service state, selecting a wireless network and a cell in accordance with highest signal strength may not be the most effective selection method to select a wireless network from the perspective of battery power consumption, considering the limited battery capacity of a wireless device.

When a suitable cell is not available, a 3GPP-compliant mobile device selects a PLMN that provides only limited service according to 3GPP TS 23.122 section 3.5 that refers to section 4.4.3.1.1. Section 4.4.3.1.1 illustrates the order of PLMN selections. The PLMN selection process on the device can be facilitated by additional information stored on the USIM. For instance, the mobile device can be provided with one or more lists of network operators such as an Equivalent Home PLMN (EHPLMN) list (section 4.4.3.1.1 item i)), a User-controlled PLMN (UPLMN) list (section 4.4.3.1.1 item ii)), an Operator-controlled PLMN (OPLMN) list (section 4.4.3.1.1 item iii)) that are stored or configured on the USIM. If section 4.4.3.1.1 items i), ii) or iii) do not apply, then the mobile device may select a PLMN that fulfills a high quality signal criterion in random order (section 4.4.3.1.1 item iv)) or a PLMN in order of decreasing signal quality (section 4.4.3.1.1 item v)). A mobile device can select any cell of any PLMN to emergency camp on as long as the cell is not barred and cell selection criteria are fulfilled (3GPP 23.122 section 3.5 indicates "Under any of these conditions, the MS attempts to camp on an acceptable cell, irrespective of its PLMN identity, so that emergency calls can be made if necessary" and "acceptable cell" is defined in 3GPP 25.304 section 4.3 as "a cell that is not barred and the cell selection criteria are fulfilled").

Similarly, for a roaming user, the selection of a wireless network and a cell in accordance with highest signal strength as described in 23.122 section 4.4.3.1.1 items iv) and v) may not result in the consumption of lowest battery power, which would be disadvantageous considering the limited battery capacity of a wireless device.

FIG. 1 is a flowchart of a method in a mobile device. The method involves determining a parameter representative of battery power consumption in respect of operation on each of at least two wireless networks (block 1-1). Block 1-1 can be omitted if the mobile device otherwise has access to/is aware of the parameter representative of battery power consumption in respect of the operation on each of the at least two wireless networks. Then, the mobile device selects a wireless network between the at least two wireless networks taking into account the parameter representative of battery power consumption in respect of operating on each of the at least two wireless networks (block 1-2). Many examples of how the mobile device can select between the at least two wireless networks taking into account the parameter representative of battery power consumption in respect of each of the at least two wireless networks are provided below. When selecting the wireless network having a parameter representative of lower battery power consumption, the mobile device becomes more battery efficient.

Figure 2:
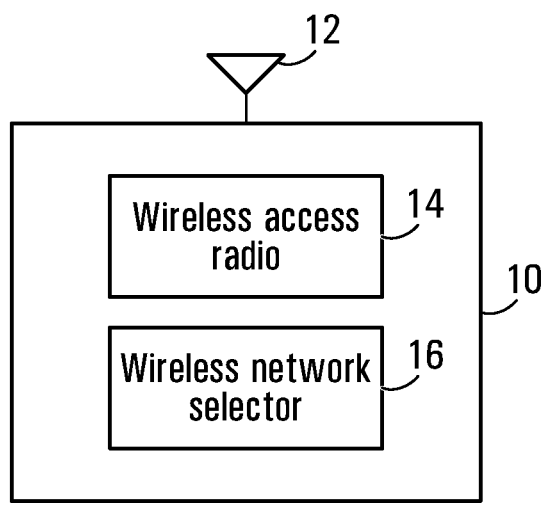
FIG. 2 is a block diagram of a mobile device having a wireless network selector.

FIG. 2 is a block diagram of a mobile device generally indicated at 10. The mobile device 10 has at least one antenna 12 and at least one wireless access radio 14. The mobile device 10 also has a wireless network selector 16 that selects between at least two wireless networks taking into account the parameter representative of battery power consumption in respect of operating on each of the at least two wireless networks. The wireless network selector 16 optionally determines the parameter representative of battery power consumption in respect of operating on each of at least two wireless networks. In some embodiments, one or more of the wireless network selection methods detailed below are implemented in the wireless network selector 16 of the mobile device 10. The wireless network selector may, for example, be implemented in one or a combination of hardware, software stored on an appropriate computer readable storage medium in combination with a processor to run the software, firmware. In some embodiments, the wireless network selector is implemented as part of a protocol stack that rules radio operations, referred to as a Non-Access Stratum layer in some contexts.

A PLMN is typically associated with a wireless network operator, and may be composed of one or more wireless networks with respective radio access technologies. Every PLMN has its own unique identifier called PLMN Id which comprises a Mobile Country Code (MCC) and a Mobile Network Code (MNC). A network operator may have more than one MCC or MNC and hence multiple PLMN Ids. The expression "wireless network" as used herein means a network that provides wireless access to mobile stations. The components of the wireless network need not necessarily be interconnected wirelessly. For example, PLMN-A may be composed of a first wireless network that operates using a 3GPP2 RAT (radio access technology) such as cdma2000, and a second wireless network that operates using one or more variants of 3GPP RATs such as GSM, WCDMA, and LTE. The wireless networks available to the mobile station to select between will be geographically dependent based on coverage. The following are a few examples.

EXAMPLE 1 first available wireless network: {PLMN-A, RAT-1}
second available wireless network: {PLMN-B, RAT-2}.
In this example, there are two different network operators, each operating on different radio access technologies.

EXAMPLE 2 first available wireless network: {PLMN-A, RAT-1}
second available wireless network: {PLMN-B, RAT-1}.
In this example, there are two different network operators, operating on the same radio access technology. In this case, selecting between the two available networks amounts to selecting between PLMN-A and PLMN-B.

EXAMPLE 3 first available wireless network: {PLMN-A, RAT-1}
second available wireless network: {PLMN-A, RAT-2}.
In this example, there is one network operator, operating on two different radio access technologies. In this case, selecting between the two available networks amounts to selecting the RAT for PLMN-A. Since in this scenario PLMN-A owns both RATs, it has the option to direct mobile devices from one RAT to another through network configurations.

In some of the examples that are described below, the available networks are referred to as PLMNs. In these cases, it can be assumed that for each PLMN there is only one available RAT at the instant contemplated. It may also be that the PLMNs are all operating on the same RAT.

In some embodiments, the method described above is executed in cases where the mobile device is allowed to choose between the at least two wireless networks. Various example situations where this arises are described below. When the mobile device is not allowed to choose, then the mobile device may select a wireless network based on other constraints/criteria.

In some embodiments, at least two wireless networks that are selected between using this method are wireless networks that pass other selection criteria that may be defined. These other selection criteria may be context specific. For example, it may be that the at least two wireless networks are first identified by determining at least two wireless networks with signal strengths that satisfy a signal strength criterion. The described method is then applied to choose between the at least two wireless networks thus determined.

In some embodiments, selection between the at least two wireless networks is performed as a function of multiple criteria, at least one which is battery power consumption in respect of operating on each of the at least two wireless networks.

In one embodiment described below, the method is applied in a mobile device that is in, or that is transitioning to, a limited service state. In another embodiment described below, the method is applied in a roaming mobile device.

Examples of Parameters Representative of Battery Power Consumption

A "parameter representative of battery power consumption" is any parameter input to the wireless network selection method that allows a comparison in terms of battery power consumption. The parameter may, for example, be a number that directly reflects battery power consumption and has no other purpose. In this case, the wireless network with the lower "battery power consumption" parameter is preferred from a battery power consumption standpoint over a wireless network where the mobile device will have higher "battery power consumption". As the mobile device selects the wireless network with the lower battery power consumption parameter, the mobile devices becomes more battery efficient and battery life is extended between charges.

Alternatively, a "parameter representative of battery power consumption" may be indirectly representative of battery power consumption. The Discontinuous Reception (DRX) cycle parameter described below is an example of this. Such a parameter can also be used to make a distinction between networks in terms of battery power consumption.

When two PLMNs operating on the same RAT are being compared, the parameter representative of battery power consumption will typically be the same parameter type. For example, if comparing two PLMNs operating using 3GPP WCDMA RAT, the below-discussed DRX cycle parameter of the two networks can be compared.

When two wireless networks operating on the different RATs are being compared, the parameter representative of battery power consumption for the first network may be of a different type than the parameter representative of battery power consumption for the second network type. For example, if comparing a wireless network operating using a 3GPP 2G RAT such as GSM to a wireless network operating using a 3GPP 3G RAT such as WCDMA, the multi-frame paging cycle period (referred to below) of the GSM network may be compared to the below-discussed DRX cycle parameter of the WCDMA network. In such a case, it may not be possible to compare the parameters directly, but the parameters may be converted to values that can be directly compared. For example, the DRX cycle parameter and the multi-frame paging cycle period can each be converted to respective receiver on time percentages that can be directly compared for the purpose of determining which wireless network is better from a battery power consumption standpoint. A receiver on time percentage is, for example, a percentage of time that the receiver is on. For example, for a simple case where there is a repeating pattern of on periods having duration "DRX on time" alternating with off periods having duration "DRX off time", the percentage can be determined according to (DRX on time/(DRX on time+DRX off time)).

DRX Cycle

As mentioned above, a specific example of a parameter representative of battery power consumption is the DRX cycle. When in DRX mode in a 3GPP 3G RAT, a mobile device only needs to monitor the channels for the paging process at periodic intervals specified by the DRX cycle coefficient. It is the wireless network operator that sets the DRX cycle coefficient from the range of values defined in the associated wireless specifications. In practice DRX cycle coefficients of 6, 7, and 8 are typically seen to be configured in DRX mode of operation. A DRX cycle in accordance with DRX cycle coefficient 6 involves waking up every 640 ms for page reception. A DRX cycle in accordance with DRX cycle coefficient 7 involves waking up every 1280 ms for page reception. And finally, a DRX cycle in accordance with DRX cycle number 8 involves waking up every 2560 ms for page reception. It is noted that that TmeasureFDD (defined in 25.133 which indicates the idle duration between neighbour cell measurements) will be higher for lower DRX cycles. For DRX 6 TmeasureFDD is 1.28 seconds which is 2 DRX cycles, whereas for DRX 8 it is 2.56 seconds which is a single DRX cycle.

Configuration of the DRX cycle coefficient to a value of 7 would increase the average standby battery consumption of a mobile device by ~35% in comparison to a DRX cycle coefficient of ~8. Similarly, a network that configures the DRX cycle coefficient as 6 would increase the average standby battery consumption of a mobile device by ~80% in comparison to DRX cycle coefficient of 8.

In addition, a longer DRX cycle (e.g. 8 instead of 7) enables the device to search for the higher priority PLMNs more efficiently with less overhead such as context switches since a longer interval is available for searching between monitoring for the paging process. The average standby current consumption of a typical UMTS wireless device in different network settings is illustrated in Table 1 below. The numbers presented in Table 1 take into account data collected from multiple wireless devices for increased confidence. For the purpose of these statistics, a wireless device in limited service state is considered, and the basic operations of the device are: i) listen to paging notifications in DRX cycle and ii) perform service scan (i.e. scan every single supported band for service acquisition) to find a suitable cell to receive its registered services. The results may be different if different basic operations are assumed. As the number of supported bands and RATs increase, so does the current consumption per scan. Table 1 below illustrates:

1. DRX mode current consumption: The DRX mode current consumption is defined as current consumption incurred only for DRX operation that involves periodic wake-up to monitor paging channel and ignores battery impact due to network scan attempts.
2. Average current consumption in limited service state: The average current consumption in limited service state is defined as current consumption in DRX operation as well as network scan attempts to find a network that may provide full subscribed service. A sample network scan can include WCDMA Band I, II, V and VI in addition to the GSM/EDGE 850, 900, 1800, and 1900 bands.
3. Standby time: Standby time is calculated taking into account the average current consumption of wireless networks with different DRX cycles and assuming a sample battery capacity of 1150 mAh. The standby time is the amount of time the mobile device can operate in DRX mode until the battery is fully drained.
4. Standby time improvement: This is the percentage improvement of network current performance as a result of choosing a DRX cycle coefficient of 7 and a DRX cycle coefficient of 8, relative to a baseline DRX cycle coefficient of 6.

TABLE 1

Effect of different network configurations on battery consumption.

|  | DRX cycle coefficient 6 (DRX cycle period 640 ms) | DRX cycle coefficient 7 (DRX cycle period 1280 ms) | DRX cycle coefficient 8 (DRX cycle period 2560 ms) |
|---|---|---|---|
| DRX current consumption (mA) | 4.700 | 3.300 | 2.500 |
| Average current consumption in limited service state (mA) | 9.443 | 8.124 | 7.371 |

TABLE 1-continued

Effect of different network configurations on battery consumption.

|  | DRX cycle coefficient 6 (DRX cycle period 640 ms) | DRX cycle coefficient 7 (DRX cycle period 1280 ms) | DRX cycle coefficient 8 (DRX cycle period 2560 ms) |
|---|---|---|---|
| Standby time (in hours) | 121.790 | 141.553 | 156.020 |
| Standby time improvement (%) | NA | 16.227 | 28.106 |

As an example, consider a PLMN-1 (From Country: A) mobile user roaming to Country: B. Among ~10 possible PLMN configurations in Country: B, consider PLMN-2, PLMN-3 and PLMN-4 are available. Assume that system configurations of the mentioned networks are as follows:

TABLE 2

Sample 3G network configurations in Country: B.

| Network | DRX Cycle Coefficient |
|---|---|
| PLMN-2 | 6 |
| PLMN-3 | 7 |
| PLMN-4 | 7 |

According to the configuration presented in Table 2, if a mobile device roaming on PLMN-3 loses coverage, it is better off choosing PLMN-4 rather than PLMN-2 if both are available. By doing so, it may be able to extend its standby time by ~20 hours. The standby time increase could have reached more than one and a half days if a wireless network with DRX 8 were an option in this scenario. Similarly, for the roaming user case, assuming the cell signal strengths of these sample service provides are comparable, a roaming PLMN-1 user will have improved standby time by choosing PLMN-3 rather than PLMN-2. The actual level of improvement in standby time depends on the user data profile. For instance, the impact of network DRX configuration would be less if the end user has a very active traffic profile e.g. if the user makes frequent voice and/or data calls, This is because a mobile device actively communicating with the wireless network during a voice or data call consumes considerably high battery power compared to DRX mode operations (page monitoring). The DRX cycle coefficient in this context might, for example, be learned from System Information type-1 message on the broadcast channel for idle mode operation or radio reconfiguration messages such as the physical channel reconfiguration message for connected mode operation in CELL_PCH and URA_PCH states.

Analogous parameters or completely different parameters may be employed for other RATs. For example, in 2G GSM, the multi-frame paging cycle period (BS-PA-MFRMS) might be considered, and in LTE, DRX cycle may be considered. These parameters and other parameters with similar functions are collectively referred to here as reception discontinuity parameters.

Spotty Coverage Metric

In some embodiments, determining a parameter representative of battery power consumption in respect of operation on each of at least two wireless networks involves determining a spotty coverage metric that reflects how spotty the coverage is for each wireless network. When a mobile device encounters a coverage hole the device triggers a wireless network scan which is battery intensive. Therefore, selecting a first wireless network with less spotty coverage compared to that of a second wireless network may make the mobile device more battery efficient and thus improve battery life.

In some embodiments, the spotty coverage metric for one or more wireless networks is configured on the mobile device using any available mechanism. Examples include during manufacture; during device deployment; over the air configuration; and configuration by the user. In some embodiments, the spotty coverage metric for one or more wireless networks is determined by the mobile device based on past experience. For example, the mobile device that has selected a particular wireless network can monitor the spottiness of coverage, for example based on how many times a coverage hole is encountered. More coverage holes will result in a less favourable spotty coverage metric.

In some embodiments, multiple parameters representative of power consumption in respect of operation on each of at least two wireless networks are considered in making a selection. For example, the decision may be made taking into account both the DRX cycle and the spotty coverage metric.

Limited Service State Embodiment

Methods and apparatus are provided in which the mobile device camps in limited service state on a wireless network taking into account the effect of the wireless network selection upon battery power consumption.

In limited service state (also known "any cell selection state"), the mobile device still needs to perform various wireless protocol activities (specific examples include monitoring paging, measurements, cell reselection, but the specific functions to be performed during limited service state are implementation and/or standards specific) that consume battery. For example, the mobile device may perform activities such as monitoring paging, system information acquisition as well as IDLE mode measurements for cell re-selection similar to a mobile device camped on acceptable cell (3GPP 25.304 sec. 5.2.9). Limited service state is similar for a device in 2G or LTE coverage, etc.

Figure 3:
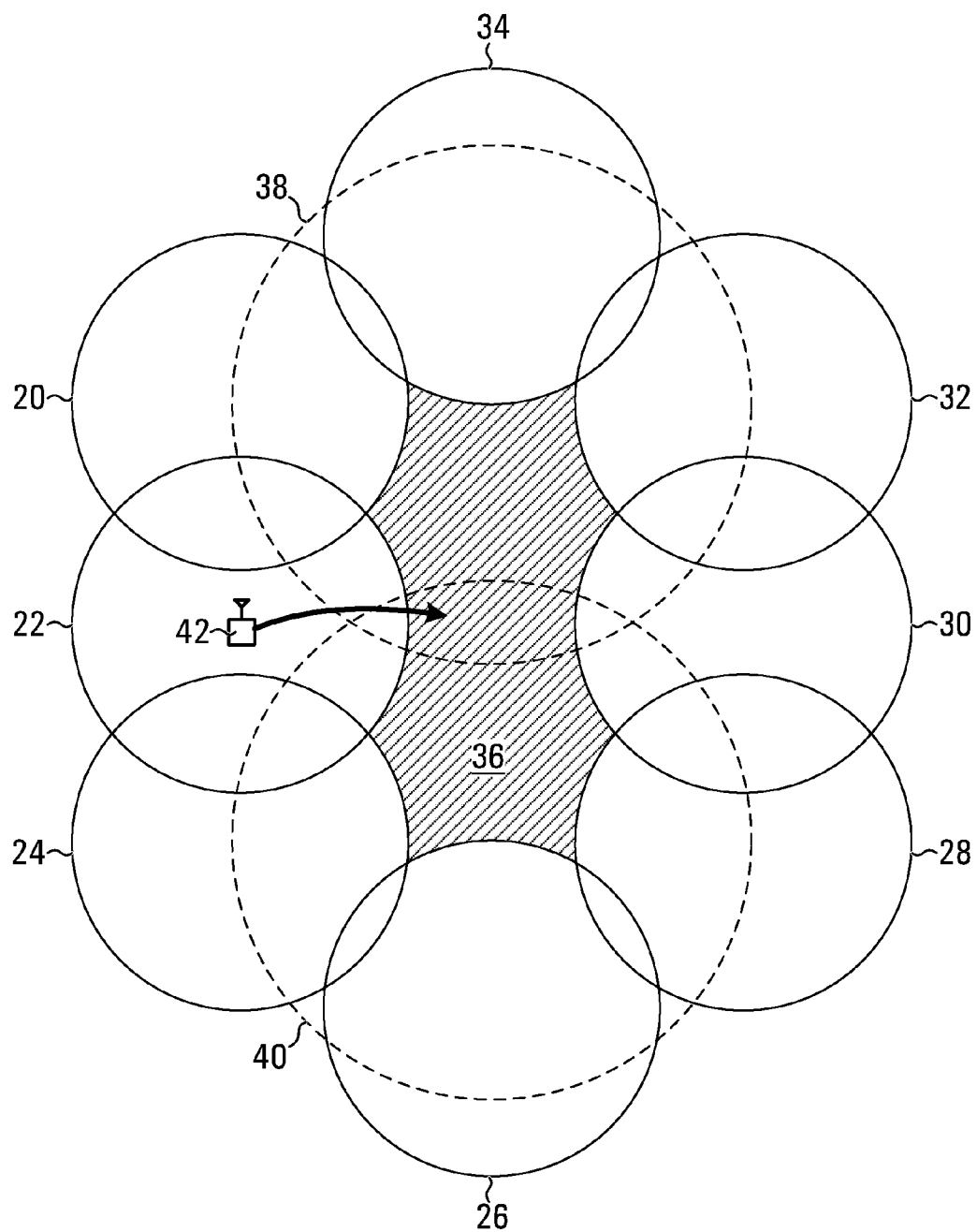
FIG. 3 is a schematic diagram showing network selection in a limited service state.

In some embodiments, the wireless network selection method is triggered when a mobile device goes into a limited service state, for example in the device's own country. In such a scenario, the mobile device that is in its own country may enter an area where there in no wireless coverage from the H-PLMN (home PLMN). If the mobile device detects the presence of cells from at least two other wireless networks (which do not have roaming agreements with the H-PLMN), then the device enters limited service state upon selection of a cell of one of the other networks. An example scenario is presented with reference to FIG. 3. Shown is a mobile device 42 whose home PLMN is PLMN-A. PLMN-A has a number of cells 20,22,24,26,28,30,32 and 34. Also shown is a single cell 38 of PLMN-B and a single cell 40 of PLMN-C. It can be seen that there is a coverage hole 36 in the coverage provided by PLMN-A. After the mobile device moves into the coverage hole 36, the mobile device cannot detect a PLMN-A cell but can detect the presence of PLMN-B and PLMN-C cells 38 and 40. In such a scenario, where there is no roaming agreement between home operator A and available PLMN-B and PLMN-C, the mobile device enters limited service state upon selection of any cell in PLMN-B or PLMN-C. The method described above is used to select between the two available operators (PLMN-B and PLMN-C).

Roaming Embodiment

Methods and apparatus are provided in which roaming users select a wireless network taking into account the effect of wireless network selection upon battery power consumption. This may, for example involve taking into account the effect of network configuration of detected wireless networks upon DRX mode operation cost from a battery life perspective.

A mobile device may be configured with one or more preferred PLMNs for roaming purposes, and a mobile operator can have different roaming agreements with other international PLMNs. A preferred PLMN can, for example, be configured in a EHPLMN (equivalent home PLMN) list, a OPLMN (operator controlled PLMN) list or a UPLMN (user controlled PLMN) selector list, a PLMN Selector list in the USIM (or similar device such as a SIM, ISIM RUIM, CSIM, etc.). PLMN selector lists contain a list of PLMNs in priority order. In some embodiments the PLMN selection methods described herein are used for a roaming mobile device in situations where the mobile device is allowed to make a selection between multiple PLMNs. This may also be the case where there are no PLMN lists/other prioritization information configured for the mobile device.

Figure 4:
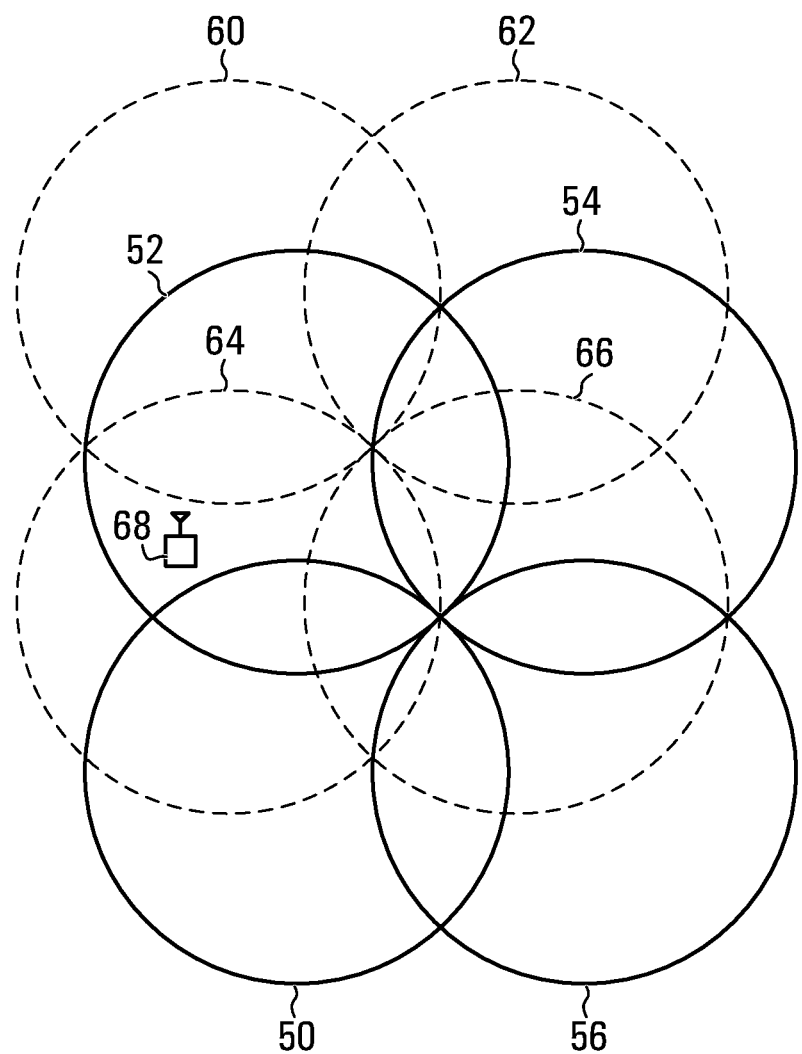
FIG. 4 is a schematic diagram showing network selection for a mobile device while roaming.

An example of this is depicted in FIG. 4. Shown is a set of cells 50,52,54,56 for a first PLMN and cells 60,62,64,66 for a second PLMN. Also shown is a mobile device 68. In this case, neither the first PLMN nor the second PLMN is the home PLMN for the mobile device 68. The mobile device makes a selection between the two PLMNs taking into account one or more parameters representative of battery power consumption.

In general, during the selection process (which wireless network to choose), the mobile device takes into account one or more parameters representative of battery power consumption.

In another embodiment, the roaming embodiment and the limited service embodiment are combined; the selection criteria may be the same or different for the two situations. That is to say, the selection criteria that are applied by a mobile device may be the same while roaming and while in limited service state, or different criteria may be applied while the mobile device is in limited service state as opposed to while roaming.

Perform Wireless Network Selection Based on Parameter Representative of Battery Power consumption and Other Criteria In some embodiments, the parameter representative of battery power consumption and one or more other criteria are used to perform wireless network selection. Depending on how the criteria are combined, the wireless network that is expected to result in the best battery power consumption for the mobile device may not always be selected. In some cases, the one or more other criteria include a quality criterion. Specific examples provided below include sufficient and relative quality.

In a first example, in order for a network to be selected, there must be an available cell that has sufficient quality. What defines "quality", and whether such quality is "sufficient" can be defined in a context specific basis.

In a first specific example of a sufficient quality criteria, an available UMTS cell has sufficient quality if it meets the definition of a "high quality PLMN" as defined in TS 25.304 section 5.1.2.2. High quality PLMN criterion is fulfilled for a WCDMA cell if the measured Received Signal Code Power (RSCP) of Primary Common Pilot Channel (P-CPICH) value is greater than or equal to −95 dBm. For this example, the mobile device is configured to be able to choose among wireless networks if the wireless network cells meet the high quality criterion thus defined. However, it should be understood that other thresholds and quality measures can be used.

In some embodiments, the set of wireless networks that the mobile device is allowed to select between are required to satisfy a relative quality criterion.

In some embodiments, the use of a relative quality criterion involves determining a quality measurement for each of a plurality of wireless networks, and then determining the at least two wireless networks (to be selected between based on battery power consumption) by comparing the quality measurements of the plurality of wireless networks so as to identify those two wireless networks that have quality measurements that are sufficiently comparable to each other as defined by a comparability criterion. A comparability criterion is any criterion that is used to make a determination of whether the quality measurements are sufficiently comparable. A specific example is provided below.

In a specific example of determining cells that are sufficiently comparable to each other as defined by a comparability criterion, at a given time, there will be a wireless network that has a cell with the best signal strength of all wireless networks/cells. The mobile device is allowed to select between that wireless network and other wireless networks having cells with signal strengths that are within a threshold amount of that of the best cell. With this approach, a second wireless network that is preferred from the power consumption standpoint will not be selected if its signal strength is poorer than that of the best wireless network by at least the threshold amount.

The relative quality criteria can be combined with the sufficient quality criterion in which case the mobile device will be able to choose between wireless networks having cell signal strengths that satisfy the sufficient quality criterion, and that also satisfy the relative quality criterion.

In a specific example, the mobile device chooses, based on battery power consumption, among available wireless networks that satisfy:

a. the cell signal strengths of the wireless networks are all higher than −95 dBm (or some other value→sufficient quality criterion) and b. the cells all have a signal strength within A dBm of the best signal strength (relative quality criterion).

In another specific example, when the signal strengths are all worse than a threshold, the mobile device does not take into account battery power consumption in the selection process. In a specific example, the mobile device selects the wireless networks according to signal strength order in such a situation. When signal strengths of at least two wireless networks are stronger than the threshold amount, the mobile device performs a selection between the at least two wireless networks taking into account the battery power consumption.

Figure 5:
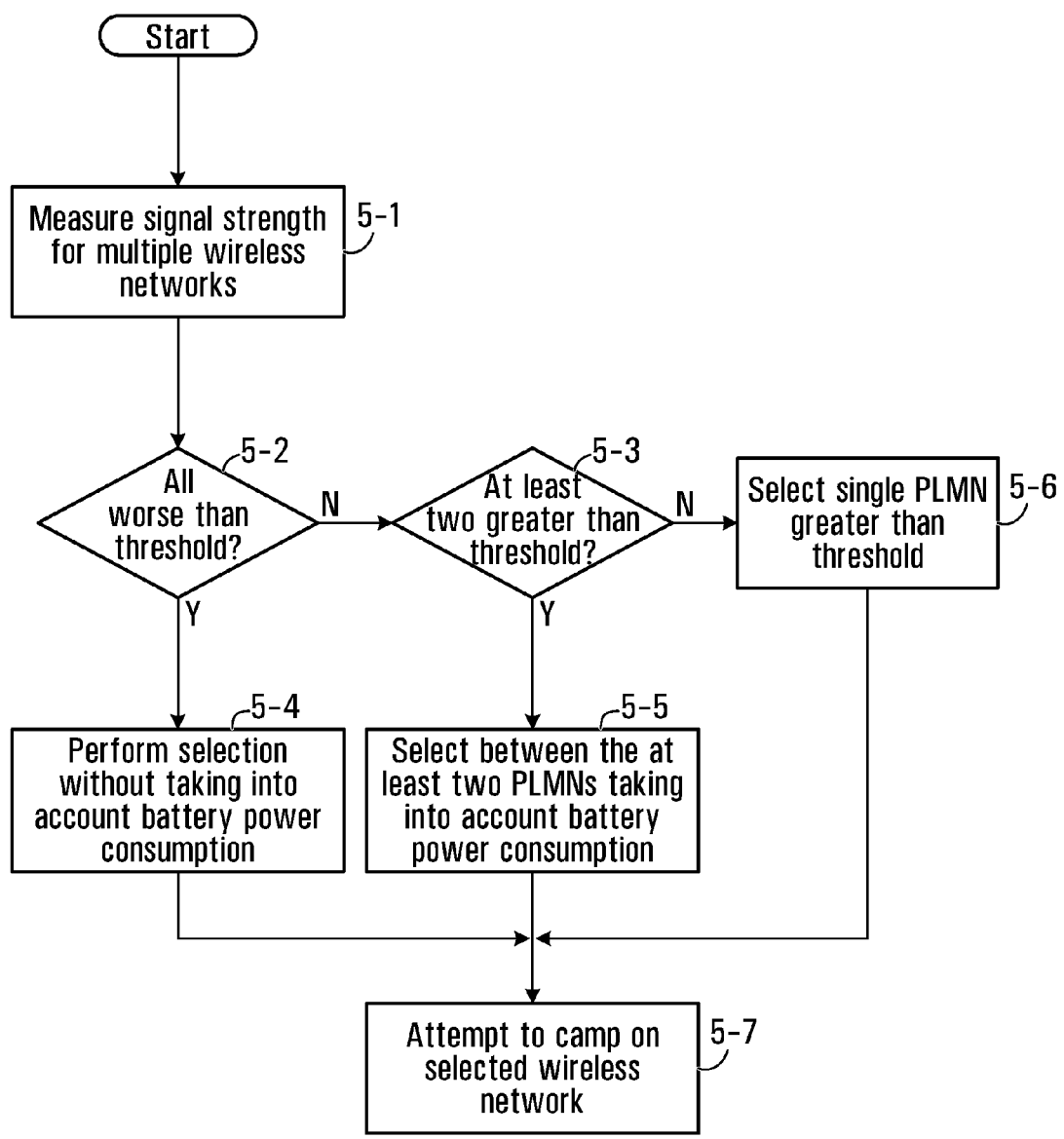
FIG. 5 is a flowchart of another method of performing network selection.

An example of this approach is depicted in the flowchart of FIG. 5. The method begins with measuring signal strength from multiple wireless networks at block 5-1. If all of the measured signal strengths are worse than a threshold (yes path block 5-2) then the mobile device performs selection without taking into account battery power consumption in block 5-4. If at least two of the wireless networks have signal strengths greater than the threshold (yes path block 5-3) then the mobile device selects between the at least two wireless networks taking into account battery power consumption at block 5-5. If only one wireless network has a signal strength greater than the threshold (no path block 5-3) then the mobile device selects the single wireless network that has signal strength greater than the threshold in block 5-6. Having made a selection of wireless network (either in block 5-4, 5-5 or 5-6) the mobile device attempts to camp on the selected wireless network in block 5-7.

The following is a specific example of this. For this example, the DRX cycle is used as the parameter representative of power consumption.

Assume the threshold for implementing the power consumption-based approach is −96 dBm. In a first scenario, assume signal strength measurements of cells and DRX parameters of cells for PLMN-D, PLMN-E and PLMN-F reflect the following:

PLMN-D at −97 dBm; DRX cycle coefficient 7
PLMN-E at −96 dBm; DRX cycle coefficient 6
PLMN-F at −100 dBm. DRX cycle coefficient 7

In this case, each of the PLMNs has a signal strength that is below the threshold, so the mobile device selects a PLMN in order of signal strength irrespective of the DRX parameter. The mobile device would attempt to camp on PLMN-D first; if that failed, it would attempt to camp on PLMN-E, and if that failed it would attempt to camp on PLMN-E.

In a second scenario, assume signal strength measurements and DRX parameters of cells for PLMN-D, PLMN-E and PLMN-F reflect the following:

PLMN-D at −97 dBm; DRX cycle coefficient 7
PLMN-E at −96 dBm; DRX cycle coefficient 6
PLMN-F at −100 dBm; DRX cycle coefficient 7
PLMN-A at −85 dBm; DRX cycle coefficient 8
PLMN-B at −80 dBm; DRX cycle coefficient 7
PLMN-C at −75 dBm; DRX cycle coefficient 6

In this case, there are three PLMNs, namely PLMN-A, PLMN-B, and PLMN-C that have signal strength measurements above the −95 dBm threshold. The mobile device selects based on the battery power consumption parameter, in this case the DRX cycle. The mobile device attempts to camp on PLMN-A first; if that fails it attempts to camp on PLMN-B, and if that fails, it attempts to camp on PLMN-C. If that fails, in some implementations, the mobile device may go on to attempt to camp on PLMNs D, E and F in signal strength order. Note that in this example, there is no relative quality criterion. Any PLMN with a signal strength above the threshold can be selected based on battery power consumption, irrespective of how much worse this might be than the best PLMN.

In these examples, selection of a PLMN is performed using one of the methods provided herein. Having selected a PLMN, an attempt to camp on a cell of the selected PLMN is made, and if that fails, another PLMN is selected, using one of the methods provided herein.

In some embodiments, an attempt to camp on a cell is an attempt to acquire the cell, without necessarily registering; in some embodiments, once a mobile station has camped on a cell, it can at least make emergency calls. Once the mobile station has camped on a cell, the other PLMN-specific activities that may effect power consumption are performed. More generally, the steps taken after selecting a PLMN using one of the methods provided herein can be defined on a context/implementation/standard specific basis.

Another Mobile Device

Figure 6:
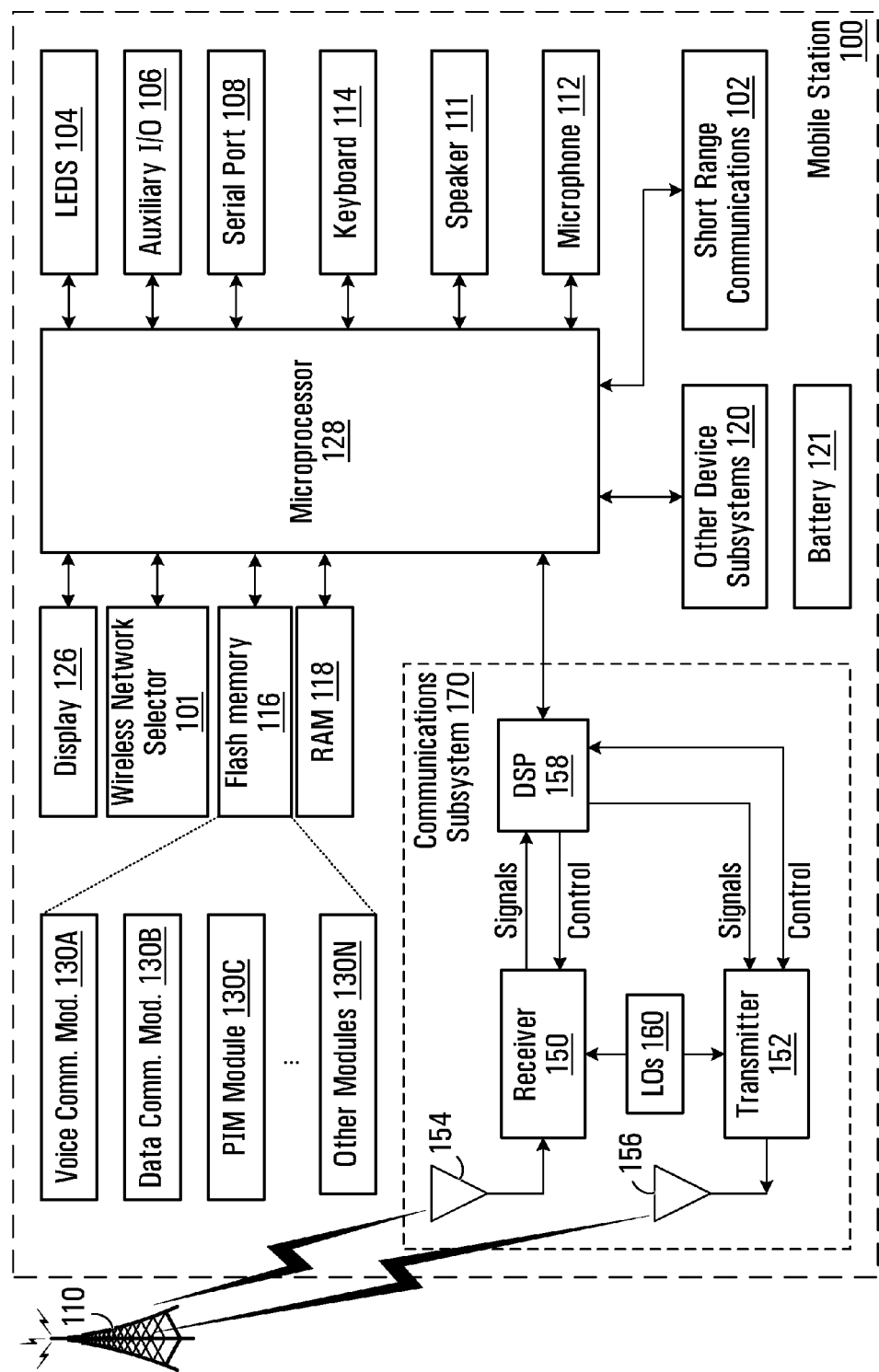
FIG. 6 is a block diagram of another mobile device having a wireless network selector.

Referring now to FIG. 6, shown is a block diagram of another mobile device 100 that is configured to perform one or a combination of the mobile device implemented methods described in this disclosure. The mobile device 100 is shown with a wireless network selector 101 for implementing features similar to those of the PLMN selector of the mobile device 10 of FIG. 2. It is to be understood that the mobile device 100 is shown with very specific details for exemplary purposes only.

A processing device (a microprocessor 128) is shown schematically as coupled between a keyboard 114 and a display 126. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Wide-band Code Division Multiple Access (WCDMA), Long Term Evolution (LTE) etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Those skilled in the art will recognize that a mobile device may sometimes be treated as a combination of a separate ME (mobile equipment) device and an associated removable memory module. Accordingly, for purpose of the present disclosure, the terms "mobile device" and "communications device" are each treated as representative of both ME devices alone as well as the combinations of ME devices with removable memory modules as applicable.

Also, note that a communication device might be capable of operating in multiple modes such that it can engage in both CS (Circuit-Switched) as well as PS (Packet-Switched) communications, and can transit from one mode of communications to another mode of communications without loss of continuity. Other implementations are possible.

Numerous modifications and variations of the present disclosure are possible in light of the above teachings. It is therefore to be understood that within the scope of the appended claims, the disclosure may be practiced otherwise than as specifically described herein.

We claim:

1. A method in a mobile device, the method comprising:
   selecting a wireless network between at least two wireless networks taking into account at least one parameter representative of battery power consumption in respect of operating on each of the at least two wireless networks;
   wherein the at least one parameter representative of battery power consumption in respect of each of the at least two wireless networks comprises a DRX (Discontinuous Reception) cycle parameter, wherein the DRX cycle parameter for a given wireless network is set to one of a predetermined range of values, and is associated with periodic intervals during which the mobile device monitors a paging process.

2. The method of claim 1 further comprising:
   repeating the step of selecting at a later time.

3. The method of claim 1 wherein the at least two wireless networks are wireless networks that the mobile station is free to choose between after other constraints have been applied.

4. The method of claim 1 further comprising:
   determining the parameter representative of battery power consumption in respect of each of the at least two wireless networks.

5. A method in a mobile device, the method comprising:
   selecting a wireless network between at least two wireless networks taking into account at least one parameter representative of battery power consumption in respect of operating on each of the at least two wireless networks;
   executing the method upon entering limited service state;
   wherein the at least one parameter representative of battery power consumption in respect of each of the at least two wireless networks comprises a DRX (Discontinuous Reception) cycle parameter, wherein the DRX cycle parameter for a given wireless network is set to one of a predetermined range of values, and is associated with periodic intervals during which the mobile device monitors a paging process.

6. The method of claim 1 further comprising: executing the method when roaming.

7. The method of claim 1 wherein:
said selecting between the at least two wireless networks also takes into account at least one other wireless network selection criterion.

8. The method of claim 7 wherein the at least one other wireless network selection criterion is a quality criterion.

9. The method of claim 8 further comprising:
determining a quality measurement for each of a plurality of wireless networks; and
including in the at least two wireless networks each wireless network of the plurality of wireless networks that has a sufficient quality measurement.

10. The method of claim 9 wherein:
determining a quality measurement for each of the plurality of wireless networks comprises measuring a signal strength for each of the plurality of wireless networks; and
including in the at least two wireless networks each wireless network of the plurality of wireless networks that has a sufficient quality measurement comprises including each wireless network having a signal strength higher than a threshold.

11. The method of claim 7 wherein the at least one other wireless network selection criterion is a relative quality criterion.

12. The method of claim 11 further comprising:
determining a quality measurement for each of a plurality of wireless networks; and determining the at least two wireless networks by comparing the quality measurements of the plurality of wireless networks so as to identify those wireless networks that have quality measurements that are sufficiently comparable to each other as defined by a comparability criterion.

13. A method comprising:
obtaining signal strength measurements for a plurality of wireless networks;
when at least two of the wireless networks have signal strength measurements above a threshold, selecting between the at least two wireless networks using the method of claim 1; and
when none of the wireless networks have signal strength measurements above the threshold, selecting a wireless network without taking into account power consumption.

14. A mobile device comprising:
at least one antenna;
at least one wireless access radio; and
a wireless network selector that selects between at least two wireless networks taking into account a parameter representative of battery power consumption in respect of operating on each of the at least two wireless networks;
wherein the at least one parameter representative of battery power consumption in respect of each of the at least two wireless networks comprises a DRX (Discontinuous Reception) cycle parameter, wherein the DRX cycle parameter for a given wireless network is set to one of a predetermined range of values, and is associated with periodic intervals during which the mobile device monitors a paging process.

15. The mobile device of claim 14 wherein the wireless network selector also determines the parameter representative of battery power consumption in respect of operating on each of at least two wireless networks.

16. A mobile device comprising:
at least one antenna;
at least one wireless access radio; and
a wireless network selector that selects between at least two wireless networks taking into account a parameter representative of battery power consumption in respect of operating on each of the at least two wireless networks;
wherein the parameter representative of battery power consumption is a DRX (Discontinuous Reception) cycle parameter, wherein the DRX cycle parameter for a given wireless network is set to one of a predetermined range of values, and is associated with periodic intervals during which the mobile device monitors a paging process;
wherein the wireless network selector selects between at least two wireless networks taking into account a parameter representative of battery power consumption in respect of operating on each of the at least two wireless networks upon entering limited service state.

17. The mobile device of claim 14 wherein the wireless network selector also takes into account at least one other wireless network selection criterion.

18. A non-transitory computer readable storage medium having stored thereon instructions that when executed by a mobile device cause the mobile device to perform a method comprising:
selecting between at least two wireless networks taking into account a parameter representative of battery power consumption in respect of each of the at least two wireless networks;
wherein the parameter representative of battery power consumption is a DRX (Discontinuous Reception) cycle parameter, wherein the DRX cycle parameter for a given wireless network is set to one of a predetermined range of values, and is associated with periodic intervals during which the mobile device monitors a paging process.

* * * * *